(12) United States Patent
Flockhart et al.

(10) Patent No.: US 8,577,017 B2
(45) Date of Patent: Nov. 5, 2013

(54) INTERRUPTING AUXILIARY AGENTS (75) Inventors: Andrew D. Flockhart, Thornton, CO (US); Joylee Kohler, Northglenn, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/250,506

(22) Filed: Sep. 30, 2011

(65) Prior Publication Data

US 2013/0083915 A1   Apr. 4, 2013

(51) Int. Cl.
*H04M 3/523* (2006.01)
(52) U.S. Cl.
USPC ............ 379/265.11; 379/265.05; 379/265.06; 379/265.12; 379/265.13
(58) Field of Classification Search
None
See application file for complete search history.

(56) References Cited

U.S. PATENT DOCUMENTS

| | | | |
|---|---|---|---|
| 6,392,666 B1 * | 5/2002 | Hong et al. | 715/736 |
| 6,611,498 B1 * | 8/2003 | Baker et al. | 370/252 |
| 7,787,609 B1 * | 8/2010 | Flockhart et al. | 379/265.01 |
| 2005/0071211 A1 | 3/2005 | Flockhart et al. | |
| 2006/0098583 A1 * | 5/2006 | Baker et al. | 370/252 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0286592 A1 * | 11/2011 | Nimmagadda | 379/266.06 |
| 2012/0183131 A1 * | 7/2012 | Kohler et al. | 379/265.12 |

* cited by examiner

*Primary Examiner* — Harry Hong
(74) *Attorney, Agent, or Firm* — Sheridan Ross P.C.

(57) ABSTRACT

A contact center is described along with various methods and mechanisms for administering the same. The contact center proposed herein provides the ability to, among other things, selectively interrupt a contact center agent in an AUXILIARY state. This enables the contact center to accommodate sudden influxes of work items without substantially increasing customer wait time.

14 Claims, 6 Drawing Sheets

INTERRUPTING AUXILIARY AGENTS

FIELD OF THE DISCLOSURE

The present disclosure is generally directed toward communications and more specifically toward contact centers.

BACKGROUND

Agents of a typical contact center have several states that are available to them. For instance, if an agent is logged in to the system but is at lunch or doing some other non-work activity they can be in an AUXILIARY state, which may also be referred to as an AUX state. Another state that is available to an agent is the BUSY state. This state signifies that the agent is currently handling a call from a customer and is not available to receive any other calls for that reason. A third state that the agent can occupy is the AVAILABLE state. When an agent has no current customers they are helping but is ready to help someone they will be in the AVAILABLE state. A fourth state that exists to call agents is the AFTER CALL WORK (ACW) state. This state lets the call controller or work assignment engine know that the agent is not on the phone with a customer but is doing work related activities for a customer. All of these states enable an agent to notify the work assignment engine of their availability or lack thereof, which in turn allows the work assignment engine to direct calls/contacts from customers to agents.

Each of the four states identified above are available to agents when they are logged into the system. Accordingly, each of the four above-identified states may be considered sub-states of a logged-in state. It should also be appreciated, that agents may have a logged-out state, which signifies that they are not logged into the contact center system.

Currently, the work assignment engine does not consider agents in the AUXILIARY state ("AUX agents") when making a contact routing decision. Thus, when the contact center experiences a sudden influx of contacts, the customers will either experience extended wait times or backup agents will have to be brought into the pool of available agents, thereby increasing the costs associated with servicing the contact.

Current work assignment engine logic dictates that only agents in the AVAILABLE state be considered during a contact routing decision. Agents in other states are generally not considered. This can greatly reduce the efficiency of the contact center operation, especially during high-traffic periods where reserve agents may be required. The utilization of reserve agents to address fluctuations in traffic is not always possible or sufficient.

SUMMARY

It is with respect to the above issues and other problems that the embodiments presented herein were contemplated. This disclosure proposes the ability to enable the work assignment engine to consider AUX agents and route contacts to those agents if circumstances require.

The present disclosure introduces the concept of allowing the work assignment engine to consider AUX agents as a possible agent for handling contacts. The logic in the work assignment engine may allow the work assignment engine to consider AUX agents at all times or only during certain periods of high traffic (e.g., when certain conditions are present within the contact center or incoming call traffic is above a certain threshold). Alternatively, the logic in the work assignment engine may only allow consideration of AUX agents for high-value customers. As another alternative, the work assignment engine may always consider AUX agents, but may require that match statistics between the contact and the AUX agent exceed similarly-calculated match statistics between the contact and an agent that is currently available before the contact can be routed to the AUX agent.

Additional mechanisms could be built into the overall system that incentivize AUX agents to accept contacts that have been initially assigned to them, but have yet to be routed to them. Specifically, automated rules could be provisioned which enable an AUX agent accepting a contact to be given AUX credit. The AUX credit may correspond to additional time that the agent is allowed to be in the AUX state. Other incentives could be offered as appropriate and the mechanism for giving these incentives could be automated such that the contact center manager does not have to personally deal with the administration of the incentive program.

In some embodiments, only AUX agents with specific "reason codes" could be considered for assignment.

As another extension, one or more of the following rules could be implemented by the work assignment engine: (1) interrupt AUX agent at any time for high-value customer; (2) interrupt AUX agent for agent contact from another agent; (3) interrupt AUX agent only available for a preferred agent having a predetermined skill set or predetermined set of benefits; (4) interrupt AUX agent only if a work item's service objective or service response objective is in jeopardy; and (5) give agents AUX credit for taking interrupt contacts.

The present disclosure does not necessarily have to be limited to AUX agents. Rather, the concepts disclosed herein could be extended to "logged-out" agents having certain presence characteristics. If the presence information for a "logged-out" agent is known, then that agent could be asked if they would be willing to handle a contact. For example, it may be possible to anticipate that a currently logged-out agent will soon login to the system (e.g., based on work schedule of the agent). Accordingly, even though the agent is not currently logged-in, it may be possible to consider that agent in a contact-routing decision if the agent will soon be AVAILABLE. In some embodiments, an agent meeting these criteria may actually be assigned a different type of state (e.g., PREDICTED AVAILABLE state) that is neither a subset of the logged-in state or the logged-out state. However, agents having this state may be considered for contact routing by the work assignment engine.

Another extension would be to increase and/or decrease the number of contacts that any agent is allowed to serve simultaneously. Thus, rather than a true interrupt, the rules for maximum number of contacts that an agent can service simultaneously could be altered. Other media could be assigned too.

In accordance with at least some embodiments, a method is disclosed that comprises:

receiving, at a contact center, a contact from a customer;

generating, in the contact center, a work item representation of the contact in the contact center;

determining, by a work assignment engine operating in the contact center, processing requirements of the work item;

generating, by the work assignment engine, a modified pool of eligible agents, wherein the modified pool of eligible agents comprises agents in the contact center that are eligible to process the work item, and wherein the modified pool of eligible agents comprises a first agent having a status other than AVAILABLE to process the work item; and assigning, by the work assignment engine, a selected agent from the modified pool of eligible agents to the work item.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
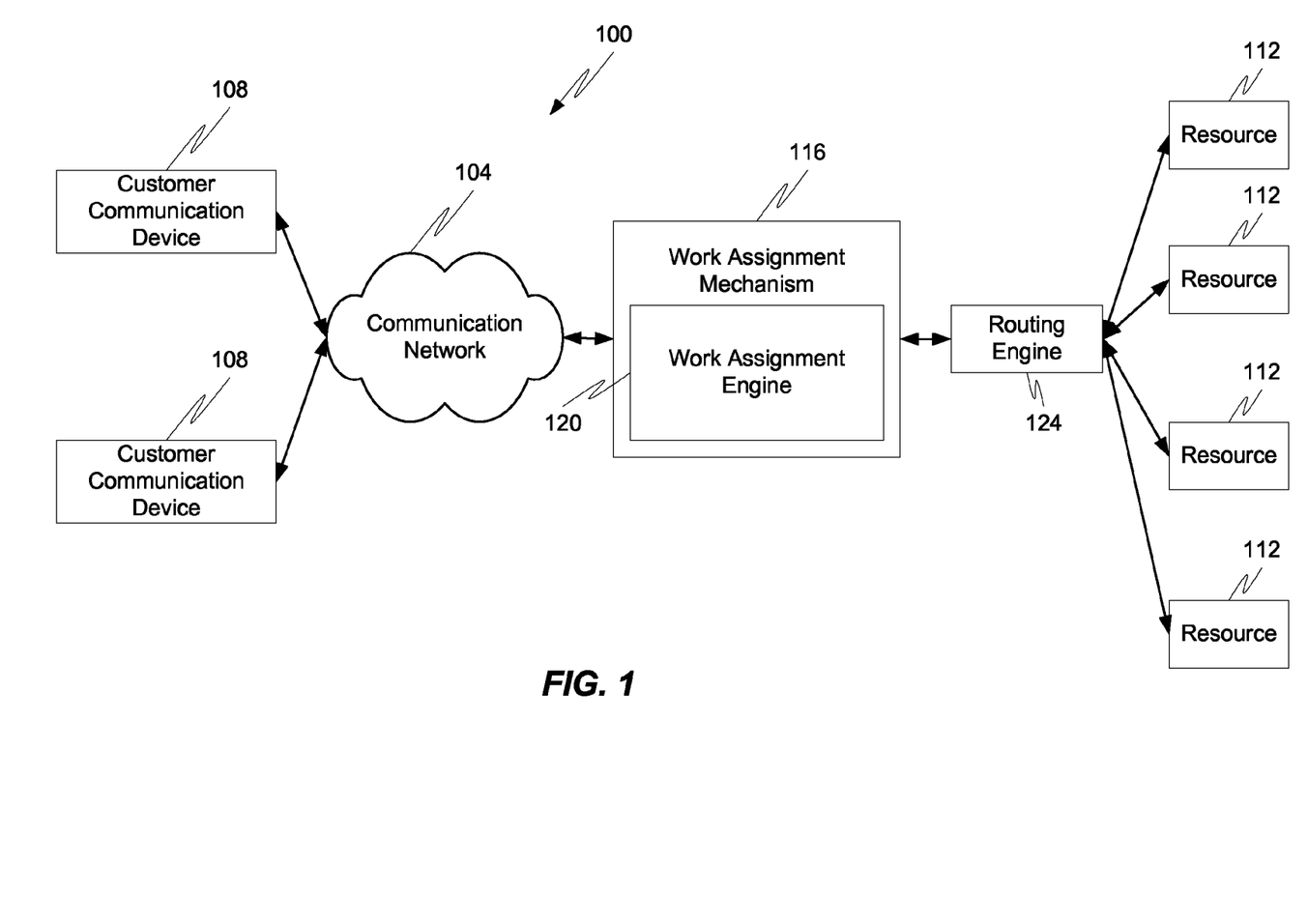
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/ wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 124 to connect the communication device 108 which initiated the communication with the assigned resource 112.

Although the routing engine 124 is depicted as being separate from the work assignment mechanism 116, the routing engine 124 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 124. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can determine which of the plurality of processing resources 112 is qualified and/or eligible to receive the work item and further determine which of the plurality of processing resources 112 is best suited to handle the processing needs of the work item. In situations of work item surplus, the work assignment engine 120 can also make the opposite determination (i.e., determine optimal assignment of a work item resource to a resource). In some embodiments, the work assignment engine 120 is configured to achieve true one-to-one matching by utilizing bitmaps/tables and other data structures.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In some embodiments, the work assignment engine 120 differs from work assignment engines of the prior art in that the work assignment engine 120 is configured to consider resources 112 being used by agents in a state other than AVAILABLE when making a work item assignment decision. In some embodiments, the work assignment engine 120 may be configured to consider one or more of AUX agents, logged-out agents, and PREDICTED AVAILABLE agents when making a work item assignment decision. In particular, the work assignment engine 120 may consider the various states of each agent for each work item assignment decision and based on the contact center conditions, the importance of the work item, and other factors, decide whether non-AVAILABLE agents should be considered eligible for receiving the work item. If the work assignment engine 120 decides to consider non-AVAILABLE agents, then the work assignment engine 120 may select the optimal agent from a group of eligible agents (which includes AVAILABLE and non-AVAILABLE agents) and assign the work item to the optimal agent. The assignment selection may be provided to the routing engine 124, which implements the results of the work assignment decision made by the work assignment engine 120. In other words, the routing engine 124 may be enabled to route the work item to the resource 112 that is being operated by the agent which was selected by the work assignment engine 120.

Figure 2:
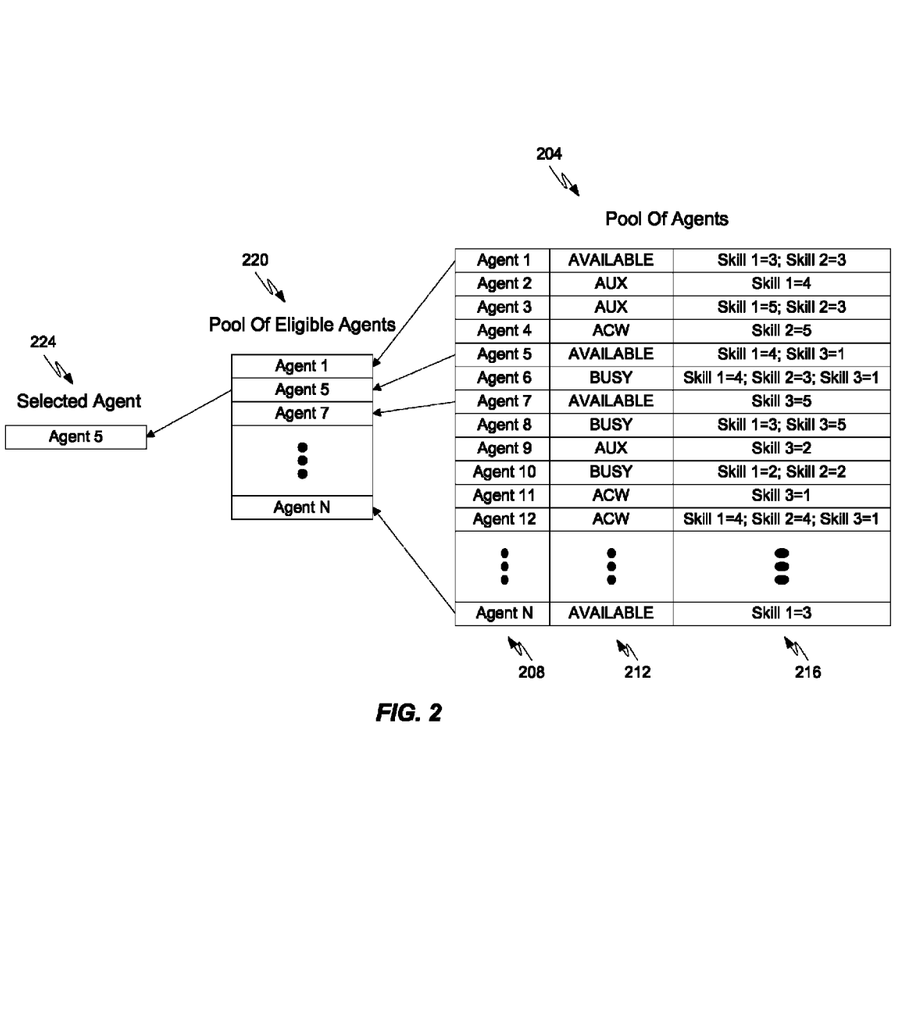
FIG. 2 is a block diagram depicting a first example of a data structure used by the work assignment engine in accordance with embodiments of the present disclosure.
Figure 3:
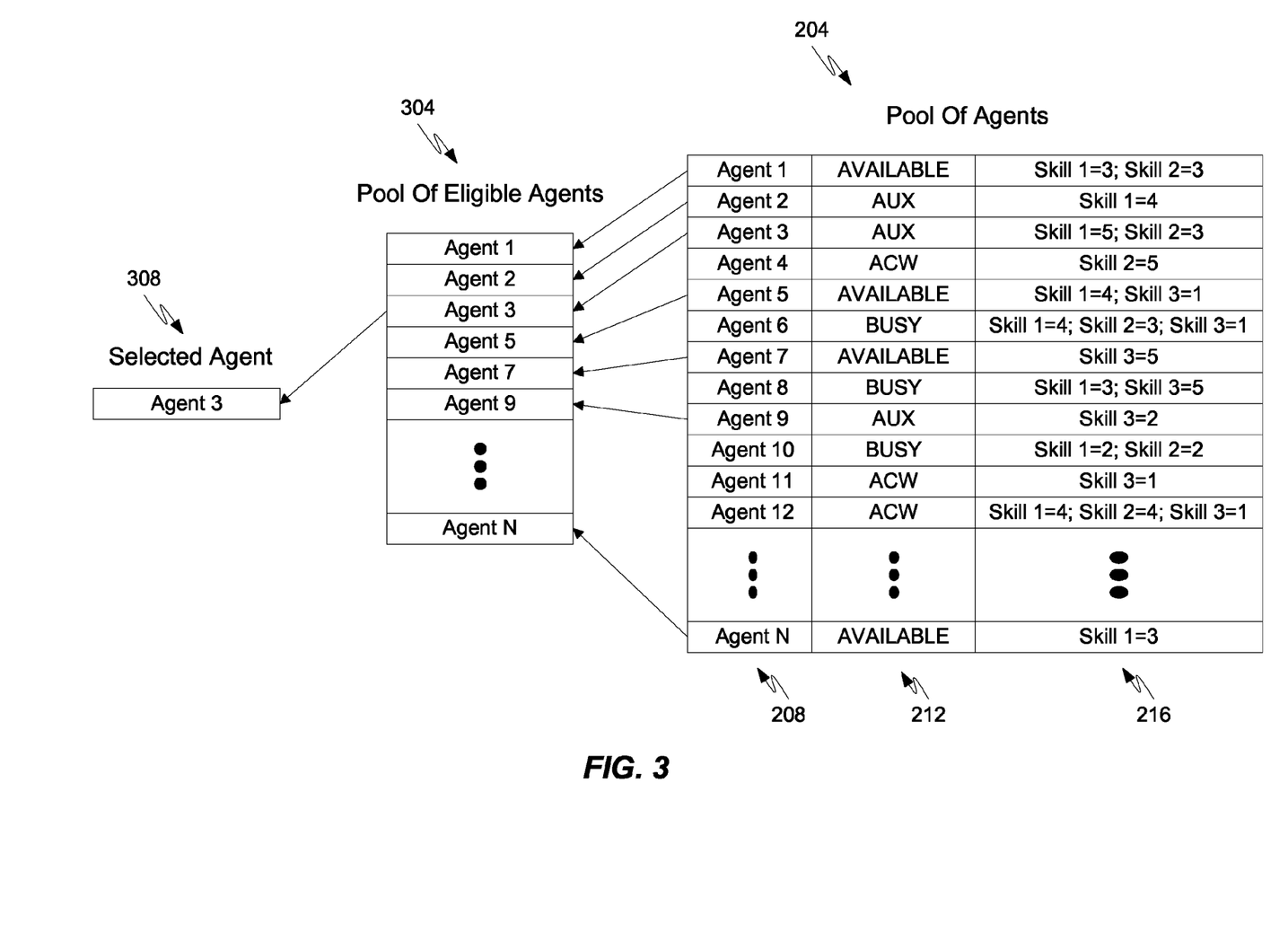
FIG. 3 is a block diagram depicting a second example of a data structure used by the work assignment engine in accordance with embodiments of the present disclosure.

With reference now to FIGS. 2 and 3, two different data structures that may be used by the work assignment engine 120 in making work assignment decisions will be described in accordance with embodiments of the present disclosure. Referring initially to FIG. 2, a first data structure is depicted in which the work assignment engine 120 considers only AVAILABLE agents in a pool of eligible agents 220. In particular, the pool of eligible agents 220 may be constructed from a larger pool of agents 204, which is a data structure storing information about all agents in the contact center. The pool of agents 204 may comprise a number of data fields for storing the relevant agent information. As some non-limiting examples, the data structure 204 may comprise an agent identifier field 208, an agent state field 212, and an agent attributes field 216.

In some embodiments, the agent identifier field 208 may be used to store information which uniquely identifies the agent within the contact center. Information used to uniquely identify an agent in the contact center may include, but is not limited to, agent name, employee number, a randomly-assigned number, social security number, and the like.

The agent state field 212 may be used to store information related to an agent's current state. As can be seen in FIG. 3, the agent state may comprise any one of AVAILABLE, AUX, BUSY, and ACW. It should also be appreciated that other states, such as PREDICTED AVAILABLE, logged-in, and logged-out may be stored within the agent state field 212. In some embodiments, the agent state field 212 may also comprise presence information for an agent that is retrieved from a presence server to which the agent has registered. The types of presence information which may be stored in the agent state field 212 includes, but is not limited to, available for a certain type of communication medium (e.g., available-IM, available-email, available-work phone, etc.), location information (e.g., GPS location information, cellular triangulation location information, WiFi/access point location information, etc.), calendar information (e.g., meeting schedules for the agent, work schedule, vacation schedule, etc.), and the like. The information contained in the agent state field 212 may be used to determine whether a particular agent is to be included in the pool of eligible agents 220.

The agent attributes field 216 may be used to store information about an agent's attributes, otherwise known as skills within the contact center. As some examples, the skills for which an agent is qualified to handle contacts may be identified within the agent attributes field 216. Furthermore, proficiency levels for one or more skills may also be indicated within the agent attributes field 216.

In some embodiments, the values stored in the agent attributes field 216 may be used to select the optimal agent 224 from among the agents in the pool of eligible agents 220. In other words, when a work item assignment decision is made, the work assignment engine 120 may determine the processing requirements/preferences of the work item (e.g., skill requirements or preferences) and compare that determined information to the skill information for the agents in the pool of eligible agents 220. The agent in the pool of eligible agents 220 with the skill set that most closely matches the processing requirements/preferences of the work item will be selected as the optimal agent 224.

The data structure depicted in FIG. 2 only includes AVAILABLE agents in the pool of eligible agents 220. Accordingly, only an AVAILABLE agent will be selected as the optimal agent 224 and the work item will be automatically assigned to the optimal agent in this situation because the agent is AVAILABLE and ready to process the work item.

FIG. 3, on the other hand, comprises a modified pool of eligible agents 304 in which non-AVAILABLE agents are considered in the pool of eligible agents 220. In some embodiments, AUX agents are included in the modified pool of eligible agents 304. It may also be possible to include logged-out agents and PREDICTED AVAILABLE agents in the modified pool of eligible agents 304 without departing from the scope of the present disclosure.

The modified pool of eligible agents 304 may be used by the work assignment engine 120 in all instances, regardless of the state of the contact center. In other embodiments, the modified pool of eligible agents 304 may only be used when the contact center is in a particular state (e.g., overloaded or behind schedule due to an influx of inbound contacts or increased processing time) or if an assignment decision is being made for a particular type of work item (e.g., high priority work item from a top-level customer).

In some embodiments, every agent in the modified pool of eligible agents 304 does not necessarily have the skill set required to process a work item. In other words, agents may be added to the modified pool of eligible agents 304 based solely on their state and with a disregard for attributes/skill levels. Accordingly, some agents in the modified pool of eligible agents 304 may not be qualified to handle a particular work item. It is up to the work assignment engine 120 to first build the modified pool of eligible agents 304 and then analyze the attributes of the agents in the modified pool of eligible agents 304 to select a particular agent 308 for assignment to the work item. In some embodiments, the selected agent 308 may correspond to the optimal agent for the work item based on the agent's attributes matching the work item's processing requirements better than all other agents in the pool of eligible agents 304. In some embodiments, the optimal agent may correspond to either an AVAILABLE agent or an AUX agent.

However, there may be instances where the selected agent 308 is not the optimal agent from the modified pool of eligible agents 304. As one non-limiting example, if the optimal agent corresponds to an AUX agent, but there is an AVAILABLE agent with an attribute set that is only slightly less optimal than the AUX agent's attribute set, then it may be desirable to utilize the AVAILABLE agent as the selected agent rather than the AUX agent whom is optimal, but who may have an increased cost associated with processing the work item. More specifically, the example of FIG. 3 shows that Agent 3 is the selected agent even though Agent 3 is an AUX agent. This means Agent 3 had attributes that met the processing requirements of a work item better than any other agent in the modified pool of eligible agents 304. If an AVAILABLE agent could be found within the modified pool of eligible agents 304 that had the same or only slightly less-optimal attributes than Agent 3 (e.g., Agent 5), it may be possible to use such an agent as the selected agent 308. Other variations on the selection of an agent from the modified pool of eligible agents 304 are also within the scope of the present disclosure.

Figure 4:
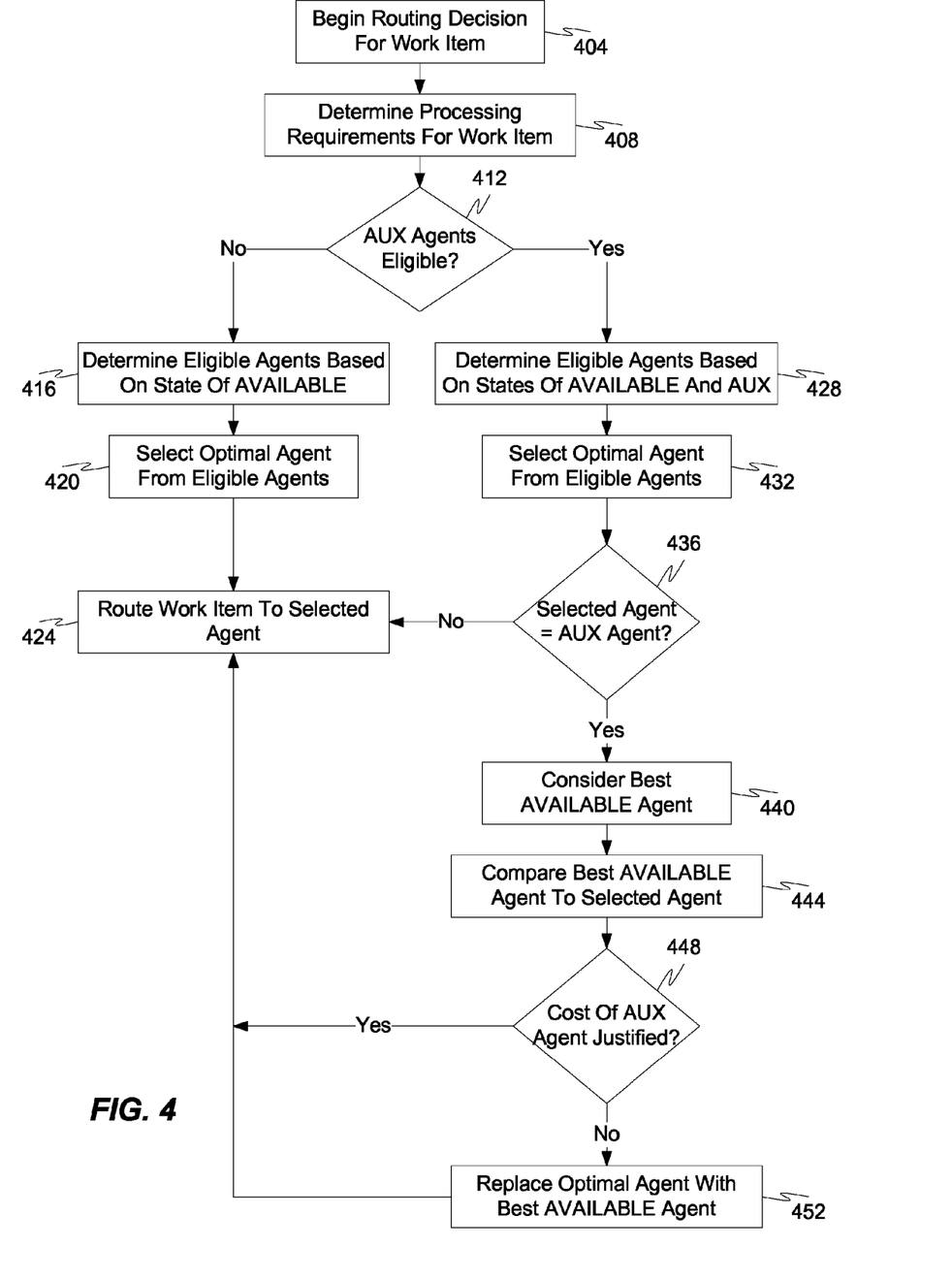
FIG. 4 is a flow diagram depicting a first work item assignment method in accordance with embodiments of the present disclosure.

With reference now to FIG. 4, a first method of making a work item assignment decision will be described in accordance with embodiments of the present disclosure. The method begins when a new work item requires a routing decision (step 404). This may occur when a new work item is received in the contact center or anytime after a previous work item has been assigned to an agent and routed to a resource 112 associated therewith. The first step of making a work item routing decision is for the work assignment engine 120 to determine the processing requirements for the work item (step 408). This may include analyzing the processing requirements that have been determined for the work item via automated mechanisms (e.g., an IVR interaction with the customer that initiated the work item, an automated analysis of the work item content by a text analysis module, a lookup to a customer history database storing information about past contacts, analyzing the source of the work item, etc.). This may also include determining skill requirements associated with the processing requirements for the work item. The processing requirements for the work item may be placed into a bitmap for the work item, where the bitmap identifies whether certain predefined processing requirements for the work item are present.

After the processing requirements have been determined for the work item, the method continues with the work assignment engine 120 determining whether or not AUX agents (or other non-AVAILABLE agents) will be eligible to receive the work item (step 412). If the query of step 412 is answered negatively, then the work assignment engine 120 will build a pool of eligible agents 220 containing only AVAILABLE agents (step 416). Otherwise, the work assignment engine 120 will build a modified pool of eligible agents 304 in which AVAILABLE and non-AVAILABLE agents are considered for matching with the work item (step 428).

Continuing down the "No" decision branch, following the creation of the pool of eligible agents 220, the work assignment engine 120 will select an optimal agent from the appropriate pool based on the attributes of the agents in the pool 220 and how well those attributes match the processing requirements of the work item (step 420). In other words, the work assignment engine 120 compares the attributes of each agent in the pool of eligible agent 220, regardless of whether or not the agents are qualified to process the work item, and then identifies which agent among the eligible agents is best suited to handle the work item. The selected agent 224 information is then provided from the work assignment engine 120 to the routing engine 124 such that the work item can be routed to a resource 112 being operated by the selected agent 224 (step 424).

If, however, the work assignment engine 120 built a modified pool of eligible agents 304, then the work item assignment process may require a few additional steps. In particular, the work assignment engine 120 will first analyze every agent in the modified pool of eligible agents 304 to identify which agent is optimally suited for handling the work item (step 432). Thereafter, the work assignment engine 120 will determine whether or not the optimal agent corresponds to an AUX agent (step 436). It should be appreciated that the analysis of step 436 does not necessarily have to be limited to AUX agents, but instead can also include any other non-AVAILABLE state.

If the optimal agent selected from the modified pool of agents 304 is an AVAILABLE agent, then the method proceeds to step 424 and the work item is routed to the optimal agent. If, however, the selected agent has a state other than AVAILABLE (e.g., an AUX agent), then the work assignment engine 120 will identify the best AVAILABLE agent (step 440) and compare the attributes to the best AVAILABLE agent with the attributes of the optimal non-AVAILABLE agent (step 444). This comparison may involve the work assignment engine 120 comparing the skills of the agents, the skill proficiencies of the agents, and how well each agent meets the processing requirements of the work item.

Based on the comparison of the agents, the work assignment engine 120 determines whether the cost of the AUX agent is outweighed by the gains in match efficiency (e.g., the cost associated with possibly selecting a non-optimal agent for the work item) (step 448). In this step, the work assignment engine 120 may consider the estimated processing time for the non-AVAILABLE agent as compared to the AVAILABLE agent (e.g., due to decreased wait time by using the AVAILABLE agent and/or due to increased proficiency of the non-AVAILABLE agent), the potential increase in customer satisfaction for using the non-AVAILABLE agent as compared to the AVAILABLE agent (e.g., due to decreased wait time and/or increased proficiency), the increased potential for upsell/cross-sell opportunities for using the non-AVAILABLE agent as compared to the AVAILABLE agent, and so on.

These potential benefits may be quantized and measured against the potential costs of using the non-AVAILABLE agent. Such costs may include any AUX credits that would have to be given to the non-AVAILABLE agent for taking the work item as well as losses in efficiency for allowing the AVAILABLE agent to remain AVAILABLE. As a non-limiting example, if the non-AVAILABLE agent and the AVAILABLE agent each have the same skill set, but the non-AVAILABLE agent has an increased proficiency in of the skills in the skill set as compared to the AVAILABLE agent, then it may be suitable to select the AVAILABLE agent in lieu of the non-AVAILABLE agent since there might only be a slight decrease in proficiency that outweighs any possible costs of selecting the non-AVAILABLE agent.

Based on the cost analysis in step 448, the work assignment engine 120 either allows the non-AVAILABLE agent to remain as the selected agent 308 or it replaces the non-AVAILABLE agent with the best AVAILABLE agent (step 452). Thereafter, the work assignment engine 120 sends the agent-selection information to the routing engine 124, which routes the work item to the selected agent 308 (step 424).

Figure 5:
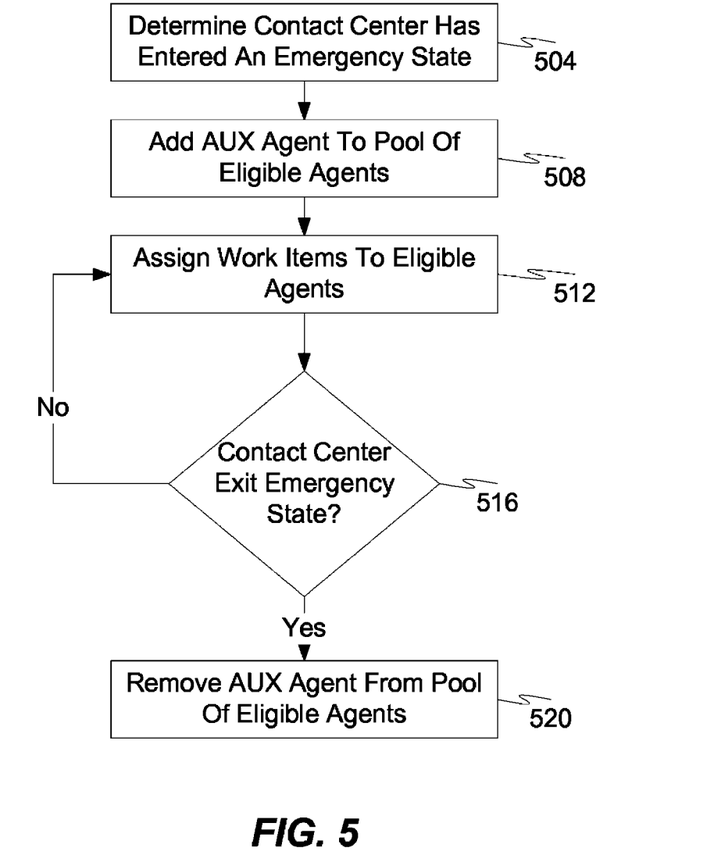
FIG. 5 is a flow diagram depicting a second work item assignment method in accordance with embodiments of the present disclosure.

Referring now to FIG. 5, a second method of making a work item assignment decision will be described in accordance with embodiments of the present disclosure. The method begins when the work assignment engine 120 determines that the contact center has entered an emergency state (step 504). This step may involve the work assignment engine 120 performing a predictive analysis of the work items waiting for assignment and the rate at which work items are being processed. Such predictive mechanisms are described in more detail in U.S. Patent Publication No. 2005/0071211 to Flockhart et al., the entire contents of which are hereby incorporated herein by reference. Alternatively, the work assignment engine 120 may simply analyze the rate of incoming work items and if that rate exceeds a predetermined threshold or if more than a predetermined number of work items are waiting for service, then the work assignment engine 120 may determine that the contact center has entered an emergency state. Other situations which may cause the contact center to enter an emergency state include, but are not limited to, the sudden decrease in the number of AVAILABLE agents, the occurrence of a natural disaster, the failure of one or more contact center components, etc.

Once the work assignment engine 120 determines that the contact center has entered an emergency state, the method continues with the work assignment engine 120 adding one or more non-AVAILABLE agents to a modified pool of eligible agents 304 when work item routing decisions are being made (step 508). As an example, the detection of an emergency state for the contact center may cause the work assignment engine 120 to begin using the modified pool of eligible agents 304 rather than the pool of eligible agents 220. As another example, the detection of an emergency state for the contact center may cause the work assignment engine 120 to add PREDICTED AVAILABLE agents and/or logged-out agents to the modified pool of eligible agents 308 rather than just AUX agents. As another example, BUSY agents may be added to the modified pool of eligible agents 304 for certain types of work items (e.g., non-real-time work items like emails, chats, etc.).

The work assignment engine 120 may then use the modified pool of eligible agents 304 constructed in step 508 to make work item assignment decisions (step 512). In some embodiments, the work assignment engine 120 is configured to build either a pool of eligible agents 220 or a modified pool of eligible agents 304 every time a work item assignment decision is made. Accordingly, each time the work assignment engine 120 is about to make such a decision, it may determine the state of the contact center to determine what types of agents should be included in the pool of eligible agents.

If the work assignment engine 120 continues to determine that the contact center is in an emergency state (step 516), then the work assignment engine 120 will continue to build modified pools of eligible agents 304 and assign work items to agents in the modified pool of eligible agents 304. If, however, the work assignment engine 120 determines that the contact center is no longer in an emergency state, then the work assignment engine 120 may begin only using the pool of eligible agents 220 which does not include AUX agents or any other non-AVAILABLE agents (step 520).

Figure 6:
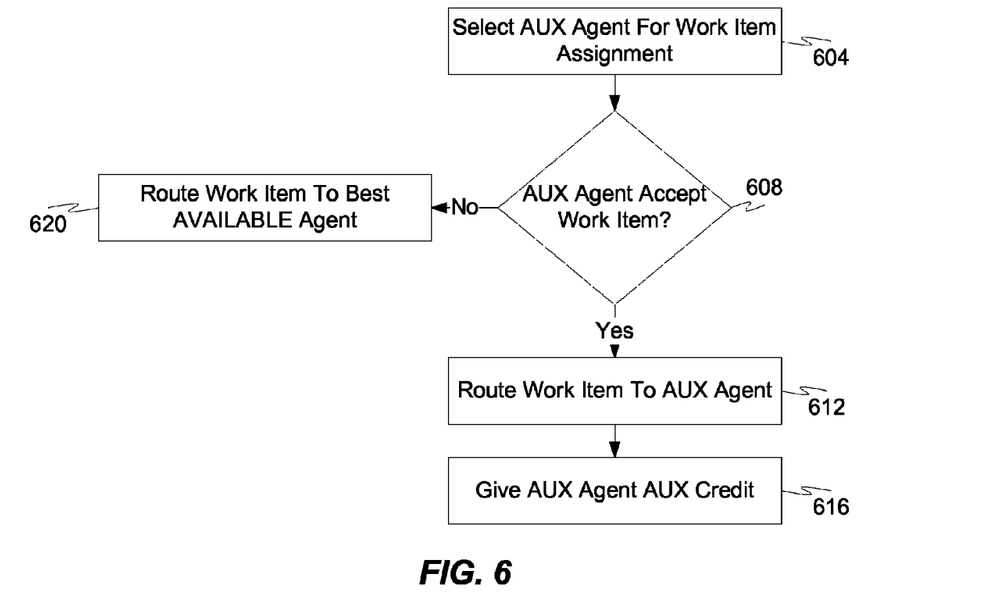
FIG. 6 is a flow diagram depicting a third work item assignment method in accordance with embodiments of the present disclosure.

Referring now to FIG. 6, a third work item assignment method will be described in accordance with embodiments of the present disclosure. The method begins when the work assignment engine 120 selects an AUX agent for work item assignment (step 604). In particular, the work assignment engine 120 may have selected an AUX agent as the selected agent 308 based on the fact that it was more cost-effective to select the AUX agent rather than the best AVAILABLE agent for a work item.

In some embodiments, the AUX agent does not necessarily have to accept the work item that has been assigned to them. Accordingly, the routing engine 124 may attempt to query the AUX agent whether or not they will accept the work item and interrupt their AUX state before routing the work item to the resource of the AUX agent. Alternatively, the work item may be automatically routed to the resource 112 of the AUX agent, but the AUX agent may not be physically present at their resource 112, which means that the AUX agent is unable to actually handle the work item.

If the AUX agent accepts the work item, then the routing engine 124 routes the work item to the AUX agent (step 612). As noted above, however, the routing step may occur automatically and before the decision step 608. After the AUX agent begins processing the work item within the appropriate amount of time, the AUX agent may be given AUX credit (step 616). Examples of AUX credit can include an increase in AUX time for the agent, bonuses, additional prizes, and other incentives not normally available to agents unless they accept AUX interrupts. The work assignment engine 120 in connection with the routing engine 124 may be adapted to automatically tack whether or not an AUX agent has accepted such a work item and, if so, automatically administer the appropriate AUX credits, thereby avoiding the need for human administration of the AUX credits.

If the AUX agent declines the work item or fails to begin processing the work item within a predetermined amount of time, then the work item is re-routed to the best AVAILABLE agent (step 620). Alternatively, a next-best AUX agent may be selected in lieu of the originally-selected AUX agent.

It should be noted that agents other than AUX agents may be eligible to receive credits for accepting work items when they are in a non-AVAILABLE state. Specifically, logged-out agents may be allowed to receive credits that are similar or identical to AUX credits. Agents in a PREDICTED AVAILABLE state, however, may not necessarily need to be provided with AUX credits as they will likely have the work item routed to them after they become AVAILABLE.

Figure 7:
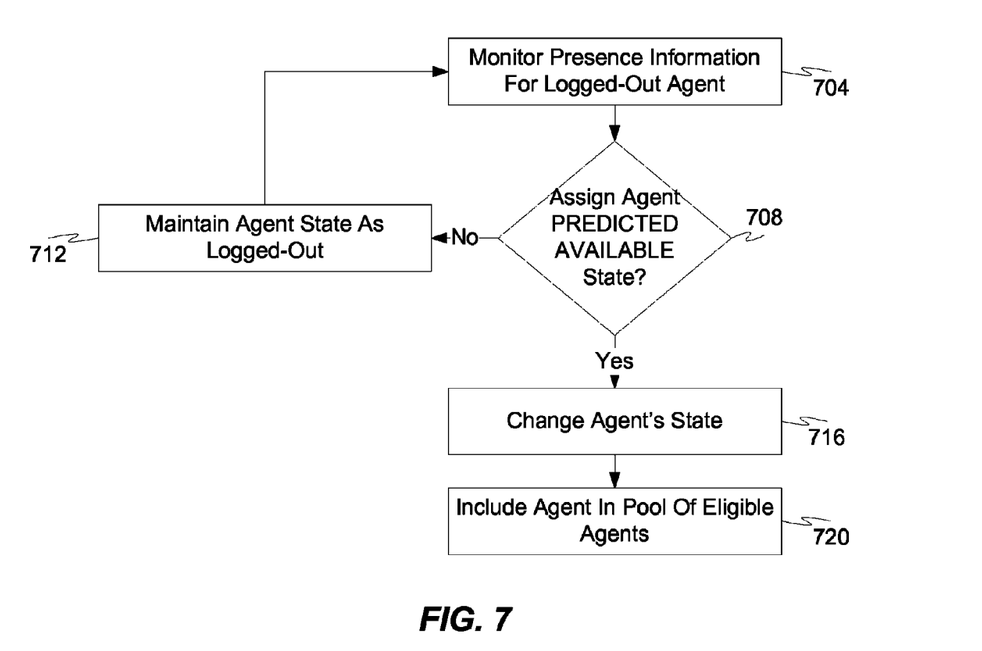
FIG. 7 is a flow diagram depicting an agent status-monitoring method in accordance with embodiments of the present disclosure.

Referring now to FIG. 7, an agent status-monitoring method will be described in accordance with embodiments of the present disclosure. The method begins with the work assignment engine 120 (or some other presence monitoring service) monitoring the presence information for a logged-out agent (step 704). As discussed above, presence information can be based on location, communication activity, calendar, and other activities determined for an agent.

Based on the analysis of the agent's presence information, the work assignment engine 120 may determine whether or not the agent is in a PREDICTED AVAILABLE state (step 708). If the query is answered negatively, then the agent's state is maintained as logged-out and no further actions are taken (step 712). If the query is answered affirmatively, then the agent's state is changed from logged-out to PREDICTED AVAILABLE (step 716). In this case, the agent may now be included in a modified pool of eligible agents 304 for work item assignment decisions (step 720).

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    receiving, at a contact center, a contact from a customer;
    generating, in the contact center, a work item representation of the contact in the contact center, the contact being a work item of the contact center;
    determining, by a work assignment engine operating in the contact center, processing requirements of the work item;
    generating, by the work assignment engine, a modified pool of eligible agents, wherein the modified pool of eligible agents comprises:
        agents in the contact center that are eligible to process the work item;
        a first agent having a status of AUXILIARY to process the work item; and
        a second agent having a status of AVAILABLE to process the work item;
    determining, by the work assignment engine, that the first agent is an optimal agent for processing the work item based on the first agent's attributes meeting the processing requirements of the work item better than any other agent in the modified pool of eligible agents;
    determining, by the work assignment engine, that the second agent is a best AVAILABLE agent for processing the work item based on the second agent's attributes meeting the processing requirements of the work item better than any other AVAILABLE agent in the modified pool of eligible agents; and
    selecting, by the work assignment engine, an agent from the modified pool of eligible agents to process the work item.

2. The method of claim 1, wherein the selected agent processes the work item, and wherein the selected agent comprises the first agent.

3. The method of claim 2, further comprising:
    providing the first agent with AUX credits for processing the work item.

4. The method of claim 3, wherein the AUX credits are automatically provided to the first agent when the first agent begins processing the work item within a predetermined amount of time and wherein the AUX credits comprise an incentive that is not given to agents when they receive a work item while having a status of AVAILABLE.

5. The method of claim 3, wherein the AUX credits comprise increased AUX time.

6. The method of claim 1, further comprising:
    comparing a cost associated with assigning the work item to the first agent to a cost associated with assigning the work item to the second agent;
    determining that the cost of assigning the work item to the second agent is greater than the cost of assigning the work item to the first agent; and
    causing the first agent to be the selected agent.

7. The method of claim 6, further comprising:
    determining that the first agent has at least one of (i) declined to process the work item and (ii) failed to process the work item within a predetermined amount of time after the work item is routed to the first agent;
    replacing the first agent with the second agent as the selected agent; and
    routing the contact associated with the work item to a resource operated by the second agent.

8. The method of claim 1, wherein the modified pool of eligible agents is generated in response to the work assignment engine determining that the contact center is in an emergency state.

9. A non-transitory computer readable medium having stored thereon instructions that cause a computing system to execute a method, the instructions comprising:
    instructions configured to determine processing requirements of a work item in a contact center;
    instructions configured to generate a modified pool of eligible agents, wherein the modified pool of eligible agents comprises:
        agents in the contact center that are eligible to process the work item;
        a first agent having a status of AUXILIARY to process the work item; and
        a second agent having a status of AVAILABLE to process the work item;
    instructions configured to determine that the first agent is an optimal agent for processing the work item based on the first agent's attributes meeting the processing requirements of the work item better than any other agent in the modified pool of eligible agents;
    instructions configured to determine that the second agent is a best AVAILABLE agent for processing the work item based on the second agent's attributes meeting the processing requirements of the work item better than any other AVAILABLE agent in the modified pool of eligible agents;
    instructions configured to compare a cost associated with assigning the work item to the first agent to a cost associated with assigning the work item to the second agent;
    instructions configured to determine that the cost of assigning the work item to the second agent is greater than the cost of assigning the work item to the first agent; and
    instructions configured to select an agent from the modified pool of eligible agents to process the work item, wherein the selected agent is the first agent.

10. The computer readable medium of claim 9, wherein the first agent has a status of PREDICTED AVAILABLE.

11. The computer readable medium of claim 10, wherein the status of the first agent is determined by analyzing presence information about the first agent.

12. The computer readable medium of claim 11, wherein the first agent is currently logged-out.

13. A contact center, comprising:
a plurality of contact-processing resources, at least some of the contact-processing resources being operated by human agents; and
a work assignment engine configured to determine processing requirements of a work item in a contact center, determine a state of the contact center, and, in response thereto, determine whether to generate a pool of eligible agents or generate a modified pool of eligible agents, wherein the pool of eligible agents comprises only human agents with a status of AVAILABLE, wherein the modified pool of eligible agents comprises human agents that are eligible to process the work item, wherein the modified pool of eligible agents comprises a first human agent having a status other than AVAILABLE to process the work item, wherein the modified pool of eligible agents comprises every human agent that would be in the pool of eligible agents in addition to the first human agent, and wherein the pool of eligible agents or the modified pool of agents are generated without regard for whether or not the human agents are skilled to process the work item.

14. The contact center of claim 13, wherein the first agent has a status of AUXILIARY.

\* \* \* \* \*